United States Patent [19]

Ruf

[11] Patent Number: 4,992,488
[45] Date of Patent: Feb. 12, 1991

[54] GLASS FIBRE-REINFORCED EPOXIDE RESIN MOULDING COMPOSITION AND ITS USE

[75] Inventor: Peter Ruf, Binningen, Switzerland

[73] Assignee: Ciba-Geigy Corporation, Ardsley, N.Y.

[21] Appl. No.: 403,845

[22] Filed: Sep. 1, 1989

Related U.S. Application Data

[63] Continuation of Ser. No. 42,769, Apr. 27, 1987, abandoned.

[30] Foreign Application Priority Data

May 7, 1986 [CH] Switzerland ............... 1865/86

[51] Int. Cl.$^5$ ................ C08K 3/26; C08K 3/40; C08L 63/04
[52] U.S. Cl. .................. 523/428; 523/457; 523/466; 310/232; 310/233; 29/597
[58] Field of Search .......... 523/428, 457, 466; 528/98; 525/481, 484; 310/232, 233

[56] References Cited

U.S. PATENT DOCUMENTS

| | | | |
|---|---|---|---|
| 2,806,016 | 9/1957 | Schwartzer | 528/98 |
| 3,280,216 | 10/1966 | Partansky | 528/98 |
| 3,530,093 | 9/1970 | Maurer | 523/457 |
| 3,849,366 | 11/1974 | Patrick | 523/457 |
| 3,909,480 | 9/1975 | Ogata | 523/457 |

FOREIGN PATENT DOCUMENTS

| | | | |
|---|---|---|---|
| 50-72981 | 6/1975 | Japan . | |
| 53-90344 | 8/1978 | Japan | 523/457 |
| 55-156341 | 12/1980 | Japan | 523/457 |
| 58-27769 | 2/1983 | Japan | 523/457 |
| 60-69126 | 4/1985 | Japan | 523/457 |
| 61-26622 | 2/1986 | Japan | 523/457 |
| 62-13432 | 1/1987 | Japan | 523/457 |

*Primary Examiner*—C. Warren Ivy
*Attorney, Agent, or Firm*—Stephen V. O'Brien

[57] ABSTRACT

An epoxide resin moulding composition, comprising
 (a) a phenol or cresol novolak epoxide resin,
 (b) dicyandiamide as a hardener,
 (c) an accelerator suitable for hardening with dicyandiamide,
 (d) 20 to 70% by weight of calcium carbonate and
 (e) 10 to 60% by weight of glass fibres, the quantity of components (d) and (e) together not exceeding 80% by weight, relative to the total weight of the epoxide resin moulding composition, is suitable with advantage for the manufacture of commutators and slipring bodies.

14 Claims, No Drawings

GLASS FIBRE-REINFORCED EPOXIDE RESIN MOULDING COMPOSITION AND ITS USE

This application is a continuation of application Ser. No. 042,769, filed April 27, 1987 now abandoned.

The present invention relates to a glass fibre-reinforced epoxide resin moulding composition based on novolak epoxide resins, containing dicyandiamide as a hardener, a hardening accelerator and calcium carbonate as a filler, and to its use for the manufacture of commutators and slipring bodies.

Thermosetting moulding compositions which are used for the manufacture of commutators or slipring bodies for use in direct or alternating current machines or three-phase current machines must meet stringent requirements with respect to processability and mechanical properties. This means that the thermosetting moulding compositions must be readily processable by the compression-moulding, transfer-moulding or injection-moulding process and, after hardening, must withstand damage withstand fitting to the armature shaft, widening of the collector bore and processing in the solder bath.

Moreover, when the commutators or slipring bodies are mechanically worked, for example by drilling, milling or sawing, the tool wear should be as low as possible. Finally, the commutators and sliping bodies should have a long service life at high speeds and, in spite of the high speeds, a minimum commutator pitch.

From ELECTRI.ONICS, January 1986, page 53-54, collectors are known which contain, as the plastic core, a glass fibre-reinforced phenolic resin filled with mica. In particular, such commutators have disadvantageous processing properties.

German Offenlegungsschrift 3,308,402 has disclosed a reactive resin composition which can be processed by screen-printing, is based on an epoxidized novolak and dicyandiamide and, in addition to large quantities of rheological aids, can also contain up to 12% by weight of calcium carbonate and, if appropriate, up to 2% by weight of glass fibres or carbon fibres. Such a reactive resin composition disclosed for screen-printing is unsuitable for the manufacture of commutators and slipring bodies.

Furthermore, German Offenlegungsschrift 2,607,551 discloses a powder mixture for the manufacture of abrasive bodies, which mixture can contain, in addition to a high proportion of abrasive material such as silicon carbide, alumina or boron carbide, also calcium carbonate and glass fabric rings. Mechanical working, such as milling or sawing, of commutators or slipring bodies containing such a moulding composition is impossible.

It has now been found that glass fibre-reinforced epoxide resin moulding compositions filled with calcium carbonate and based on phenol or cresol novolak epoxide resins are more suitable for the manufacture of commutators and slipring bodies.

The present invention thus relates to epoxide resin moulding compositions, comprising
(a) a phenol or cresol novolak epoxide resin,
(b) dicyandiamide as a hardener,
(c) an accelerator suitable for hardening with dicyandiamide,
(d) 20 to 70% by Weight of calcium carbonate and
(e) 10 to 60% by eight of glass fibres, the quantity of components (d) and (e) together not exceeding 80% by weight, relative to the total weight of the epoxide resin moulding composition.

As component (a), the moulding compositions according to the invention preferably contain a cresol novolak epoxide resin. Component (a) in the epoxide resin moulding compositions according to the invention can also be replaced by 0.1 to 40% by weight, preferably 5 to 25% by weight, relative to the total quantity of the epoxide resin, of an aromatic di- or poly-glycidyl ether. Suitable examples of such glycidyl compounds are the diglycidyl ethers of bisphenols, such as bis-(4-hydroxyphenyl)-methane (bisphenol F), 2,2-bis-(4-hydroxyphenyl)-propane (bisphenol A), 2,2-bis-(4-hydroxy-3,5-dibromophenyl)-propane (tetrabromobisphenol A) or bis-4-hydroxyphenyl sulfone. Examples of suitable polyglycidyl ethers are 1,1,2,2-tetrakis-(4-glycidyloxyphenyl)-ethane and 1,3,5-triglycidyloxybenzene. Such glycidyl compounds are known, and some of them are commercially available.

Preferably, the diglycidyl ethers of bisphenols, especially the diglycidyl ether of bisphenol A, are used as the aromatic glycidyl ethers.

In the moulding compositions according to the invention, 0.16 to 0.5 mol of dicyandiamide per epoxide equivalent is in general used. Preferably, the dicyandiamide is added in such quantities that there is 0.25 to 0.35 mol of dicyandiamide per epoxide equivalent in the moulding compositions according to the invention.

The accelerators (c) employed are the conventional accelerators known for the hardening of epoxide resins with dicyandiamide, for example alkali metal alcoholates, tertiary amines, phosphines such as triphenylphosphine, quaternary ammonium compounds, substituted ureas such as N-(4-chlorophenyl)-N,N'-dimethylurea or N-(3-chloro-4-methylphenyl)-N,N'-dimethylurea, a Mannich base such as 2,4,6-tris-(dimethylaminomethyl)-phenol, imidazole or imidazole derivatives such as 2-methylimidazole, 2-ethylimidazole, 2-ethyl-4-methylimidazole, 2-phenylimidazole or benzimidazole, and $BCl_3$ or $BF_3$ complexes with tertiary amines such as trimethylamine, piperidine, pyridine or hexamethylenetetramine. The accelerator used is preferably an imidazole, especially 2-ethylimidazole.

The quantity to be used of the hardening accelerator (c) is known to those skilled in the art and depends on the application of the moulding composition. In general, 1–30 parts by weight, preferably 3–20 parts by weight and especially 5–12 parts by weight, of the accelerator (c) are in general employed per 100 parts by weight of dicyandiamide.

The calcium carbonate used according to the invention is preferably highly disperse and substantially anhydrous. The particle size of the calcium carbonate can be, for example, 0.2–100 μm and preferably 0.5–50 μm.

The $CaCO_3$ present in the moulding compositions according to the invention can partially be replaced by other fillers, the moulding composition containing at least 30% by weight of calcium carbonate and 0.1 to 40% by weight of kaolin, wollastonite, dolomite, barium sulfate, talc, mica or aluminium oxide trihydrate as a further filler, the total quantity of the fillers not exceeding 70% by weight, relative to the total weight of the epoxide resin moulding composition.

If the moulding composition according to the invention contains a further filler in addition to calcium carbonate, it preferably contains at least 40% by weight of calcium carbonate and 0.1 to 30% by weight of the abovementioned filler, relative to the total weight of the epoxide resin moulding composition.

As the further filler, the moulding composition according to the invention preferably contains kaolin.

The particularly preferred moulding composition according to the invention contains calcium carbonate as the only filler.

As glass fibres, conventional, commercially available chopped glass fibres (chopped strands) are added to the moulding compositions according to the invention. Ground glass fibres or glass rovings can also be added as the glass fibres to the mixtures according to the invention. Preferably, chopped glass fibres of a length of 0.1–30 mm are used.

The moulding compositions according to the invention can be prepared in the conventional manner by means of known mixer units, such as a ball mill, co-kneader, roll mill or extruder. The moulding compositions according to the invention can be prepared by the dry process or the melting process. It is also possible to mix the components of the moulding compositions according to the invention in an organic solvent and then to dry them, with evaporation of the solvent. This mixing process is necessary if glass rovings are used.

The moulding compositions according to the invention are processed in the conventional manner by the compression-moulding, transfer-moulding or injection-moulding process. Temperatures of 140–200° C., preferably 160–190° C., and pressures of 300–2000 bar are in general applied in these processes.

Moreover, mould release agents such as OP wax (mould release agent from Hoechst), montan wax and carnauba wax, and also pigments, dyes and adhesion promoters can also be added to the moulding compositions according to the invention. Preferably, the moulding compositions according to the invention are free of asbestos and preferably contain mould release agents in quantities of 0.2 to 2.0% by weight, especially 0.5 to 1.5% by weight, relative to the total weight of the epoxide resin moulding composition.

As mentioned at the outset, the moulding compositions according to the invention are particularly suitable for the manufacture of commutators and slipring bodies wherein the insulating parts thereof consist of the cross-linked epoxy resin molding composition according to the instant invention. The present invention thus also relates to the use of the moulding compositions according to the invention for the manufacture of commutators and slipring bodies and to the collectors or slipring bodies manufactured with the use of the moulding compositions according to the invention.

The moulding compositions according to the invention are preferably used as compression-moulding compositions.

In the examples, the following compounds or raw materials are used:

Epoxide resin A: Cresol novolak epoxide resin having an epoxide content of 4.3 equivalents/kg and a Kofler melting point of 79° C.

Epoxide resin B: Phenol novolak epoxide resin having an epoxide content of 5.4 equivalents/kg and a Durran softening point of 69–77° C.

Epoxide resin C: Mixture of epoxide resin A and a bisphenol A diglycidyl ether resin having an epoxide content of 3.4 equivalents/kg and a Kofler softening point of 50° C., in a weight ratio of 60:40.

Epoxide resin D: Mixture of epoxide resin A and a bisphenol F diglycidyl ether resin having an epoxide content of 5.9 equivalents/kg and a viscosity of 6600 mPa.s, in a weight ratio of 93.4:6.4.

Accelerator 1: 2-Ethylimidazole

Accelerator 2: Mixture of 1 part by weight of 2-ethylimidazole and 3 parts by weight of phenol novolak, which mixture was pulverized after melting together and cooling.

Accelerator 3: N-(3-Chloro-4-methylphenyl)-N,N'-dimethylurea

Accelerator 4: Hexamethylenetetramine

Hardener: Dicyandiamide (1-cyanoguanidine)

Glass Fibres: Glass fibres, chopped to 4.5 mm length (chopped strands)

Glass rovings: (commercially available)

Calcium carbonate: Calcite powder or chalk powder, which is commercially available under the name OMYA ® BSH (from Plüss-Staufer AG).

Mould release agent: OP wax (Hoechst)

The test methods applied in the examples below were carried out as follows:

Solder bath

The temperature of the lead/tin solder bath is 350° C. The commutator containing the fully hardened compression-moulding composition is completely immersed in the solder bath and rotated for 20 seconds.

Centrifugal test

The commutator containing the fully hardened compression-moulding composition is tested, before and after the solder bath, on a centrifugal machine having a maximum speed of rotation of 40,000 revolutions per minute (rpm), fitted with an electronic tachometer and digital indicator. The speed of rotation is measured at which the commutator falls apart.

Mandrel-fitting test

A rotary mandrel of 15 mm diameter is inserted into the commutator (internal diameter 15 mm) containing the fully hardened compression-moulding composition. A rotary mandrel cone is forced in by means of a pulsating machine until the collector breaks. The widening of the commutator is calculated in % from the travel of the rotary cone, relative to its conicity.

Abrasion test

DIN standard test bars of size $120 \times 15 \times 10$ mm are prepared in the usual way from the compression-moulding composition according to the invention. Hardening conditions: 10 minutes at 170°/1500 bar. The bar is clamped longitudinally into a drilling upright in such a way that drill holes can be made on the 10 mm side. The drilling machine, which can be regulated, is set to 1400 rpm. It is loaded with 17.5 kg by means of a lever. For drilling, special 4 mm HSS drills (heavy-duty high-speed steel) are used. 10 drill holes of 1 mm depth are made, the drill being taken out after each drilling, cooled in water, dried and reinserted. The abrasion test is evaluated in such a way that the time required for the 10th drilling is divided by the time required for the 1st drilling. The numerical value obtained is given as the factor in Table 2:

$$\frac{\text{Time for the 10th drilling}}{\text{Time for the 1st drilling}} = \text{abrasion value [factor]}.$$

Preparation of the hardener master batches 1-3

The compounds or raw materials used are weighed in the quantities indicated in Table 1 into a 5-liter laboratory ball mill and ground for 16 hours.

TABLE 1

| Hardener masterbatch No. | | 1 | 2 | 3 |
|---|---|---|---|---|
| Glass fibres, ground | [parts by weight] | 632 | 688 | — |
| Kaolin | [parts by weight] | — | — | 797.8 |
| Dicyandiamide, fine | [parts by weight] | 224 | 168 | 170.2 |
| Accelerator 2 | [parts by weight] | 100 | 100 | — |
| Mould release agent | [parts by weight] | 20 | 20 | — |
| Furnace black | [parts by weight] | 24 | 24 | 32 |

Preparation of the compression-moulding composition Nos. 1-3

With the exception of the glass fibres, the raw materials are weighed in the quantities indicated in Table 2 into a 5-liter laboratory ball mill and ground for 8 hours. The pulverulent premix thus obtained is melted together with the chopped glass fibres (4.5 mm length) in a laboratory co-kneader at 100° C. and kneaded. The emerging mass is cooled down, ground into granules and then pressed to give tablets which are processed into test specimens in steel compression-moulds at 170° C. and 1500 bar. The compression-moulding time is 10 minutes in the preparation of the DIN standard test bars and 4 minutes in the preparation of the commutators.

Preparation of the compression-moulding compositions 4 and 5

With the exception of the glass rovings, the raw materials are dissolved or suspended, in the quantities indicated in Table 2, in acetone. The glass rovings are continuously drawn through this solution or suspension, dried in a drying tower with hot air of about 200° C., cooled down and then cut into small bars of 3-25 mm length. The compression-moulding compositions thus obtained are processed into test specimens and commutators analogously to compression-moulding compositions 1-3.

TABLE 2

| Compression-moulding composition No. | | 1 | 2 | 3 | 4 | 5 |
|---|---|---|---|---|---|---|
| Epoxide resin A | [parts by weight] | 23.0 | 23.0 | — | — | 22.4 |
| Epoxide resin B | [parts by weight] | — | — | 23.0 | — | — |
| Epoxide resin C | [parts by weight] | — | — | — | 23.8 | — |
| Hardener masterbatch 1 | [parts by weight] | — | 12.5 | 12.5 | — | — |
| Hardener masterbatch 2 | [parts by weight] | 12.5 | — | — | — | — |
| Hardener masterbatch 3 | [parts by weight] | — | — | — | 10.1 | 12.1 |
| Accelerator 1 | [parts by weight] | — | — | — | 0.15 | 0.14 |
| Calcium carbonate | [parts by weight] | 43.6 | 43.6 | 43.6 | 26.95 | 22.66 |
| Mould release agent | [parts by weight] | 0.9 | 0.9 | 0.9 | 1.0 | 0.9 |
| Glass rovings | [parts by weight] | — | — | — | 38.0 | 41.8 |
| Glass fibres | [parts by weight] | 20.0 | 20.0 | 20.0 | — | — |
| Martens heat distortion point, DIN 53 458 [°C.] | | 187 | 175 | 184 | 188 | 233 |
| Flexural strength according to DIN 53 452 [N/mm$^2$] | | 134 | 130 | 132 | 172 | 161 |
| Centrifugal test | | | | | | |
| before solder bath [rpm] | | >40000 | >40000 | >40000 | >40000 | >40000 |
| after solder bath [rpm] | | >40000 | >40000 | >40000 | >40000 | >40000 |
| Mandrel-fitting test | | | | | | |
| before solder bath [%] | | 1.48 | 1.70 | 1.61 | 1.50 | 1.87 |
| after solder bath [%] | | 1.65 | 1.70 | 1.32 | 1.61 | 1.54 |
| Abrasion test [factor] | | 1.24 | 1.0 | 1.0 | 1.17 | 1.5 |

Preparation of the hardener masterbathes 4 and 5

The compounds and raw materials to be used are weighed in the quantities indicated in Table 3 into a 5-liter laboratory ball mill and ground for 16 hours.

TABLE 3

| Hardener masterbatch No. | 4 | 5 |
|---|---|---|
| Glass fibres, ground [parts by weight] | 722 | 692 |
| Dicyandiamide [parts by weight] | 244 | 244 |
| Accelerator 3 [parts by weight] | 10 | — |
| Accelerator 4 [parts by weight] | — | 40 |
| Mould release agent [parts by weight] | 20 | 20 |
| Furnace black [parts by weight] | 24 | 24 |

The preparation of the compression-moulding compositions 6 to 12 is carried out analogously to that of compression-moulding compositions 1-3, by weighing all the raw materials, with the exception of the glass fibres of 4.5 mm length, into a 5-liter laboratory ball mill and grinding them for 8 hours.

TABLE 4

| Compression-moulding composition No. | | 6 | 7 | 8 | 9 | 10 | 11 | 12 |
|---|---|---|---|---|---|---|---|---|
| Epoxide resin A | [parts by weight] | 15.6 | — | 23.0 | 23.0 | 23.0 | 23.0 | 23.0 |
| Epoxide resin D | [parts by weight] | — | 15.6 | — | — | — | — | — |
| Hardener masterbatch 1 | [parts by weight] | 8.4 | 8.4 | 12.5 | — | 12.5 | — | 12.5 |
| Hardener masterbatch 4 | [parts by weight] | — | — | — | 12.5 | — | — | — |
| Hardener masterbatch 5 | [parts by weight] | — | — | — | — | — | 12.5 | — |
| Calcium carbonate | [parts by weight] | 60.0 | 20.0 | 38.6 | 43.6 | 21.8 | 43.6 | 25.0 |
| Talc | [parts by weight] | — | — | — | — | 21.8 | — | — |
| Wollastonite | [parts by weight] | — | — | 5.0 | — | — | — | — |
| Dolomite (Microdol 325) | [parts by weight] | — | — | — | — | — | — | 18.6 |
| Mould release agent | [parts by weight] | 1.0 | 1.0 | 0.9 | 0.9 | 0.9 | 0.9 | 0.9 |

TABLE 4-continued

| Compression-moulding composition No. | | 6 | 7 | 8 | 9 | 10 | 11 | 12 |
|---|---|---|---|---|---|---|---|---|
| Glass fibres, 4.5 mm | [parts by weight] | 15.0 | 20.0 | 20.0 | 20.0 | 20.0 | 20.0 | 20.0 |
| Glass fibres, ground | [parts by weight] | — | 35.0 | — | — | — | — | — |
| Martens heat distortion point, DIN 53 458 [°C.] | | 172 | 169 | 176 | 167 | 178 | 180 | 172 |
| Flexural strength according to DIN 53 452 [N/mm$^2$] | | 126 | 132 | 144 | 135 | 120 | 114 | 122 |
| Centrifugal test | | | | | | | | |
| before solder bath [rpm] | | >40000 | >40000 | >40000 | >40000 | >40000 | >40000 | >40000 |
| after solder bath [rpm] | | >40000 | >40000 | >40000 | >40000 | >40000 | >40000 | >40000 |
| Mandrel-fitting test | | | | | | | | |
| before solder bath [%] | | 1.20 | 1.43 | 1.61 | 1.46 | 1.46 | 1.61 | 1.47 |
| after solder bath [%] | | 1.35 | 1.57 | 1.65 | 1.63 | 1.43 | 1.73 | 1.82 |
| Abrasion test [factor] | | 1.0 | 1.1 | 1.3 | 1.0 | 1.0 | 1.0 | 1.2 |

What is claimed is:

1. An epoxide resin molding composition for compression molding, transfer molding or injection molding consisting essentially of
   (a) a solid phenol or cresol novolak epoxide resin,
   (b) dicyandiamide as hardener,
   (c) an accelerator suitable for hardening with dicyandiamide,
   (d) 20 to 70% by weight of calcium carbonate,
   (e) 10 to 60% by weight of glass fibers, the quantity of components (d) and (e) together not exceeding 80% by weight, relative to the total weight of the epoxide resin molding composition, and
   (f) a mold release agent.

2. An epoxide resin moulding composition according to claim 1, which contains a cresol novolak epoxide resin.

3. An epoxide resin moulding composition according to claim 1, which contains a phenol or cresol novolak epoxide resin and 0.1 to 40% by weight, relative to the total quantity of the epoxide resin, of an additional aromatic di- or polyglycidyl ether.

4. An epoxide resin moulding composition according to claim 3, which contains bisphenol A diglycidyl ether as said additional aromatic diglycidyl ether.

5. An epoxide resin moulding composition according to claim 1, which contains 0.16 to 0.5 mol of dicyandiamide per epoxide equivalent.

6. An epoxide resin moulding composition according to claim 1, which contains 0.25 to 0.35 mol of dicyandiamide per epoxide equivalent.

7. An epoxide resin moulding composition according to claim 1, which contains an imidazole as the accelerator.

8. An epoxide resin moulding composition according to claim 7, which contains 2-ethylimidazole.

9. An epoxide resin moulding composition according to claim 1, which contains at least 30% by weight of calcium carbonate and 0.1 to 40% by weight of kaolin, wollastonite, dolomite, barium sulfate, talc, mica or aluminium oxide trihydrate as a further filler, the total quantity of fillers not exceeding 70%, relative to the total weight of the epoxide resin moulding composition.

10. An epoxide resin moulding composition according to claim 9, which contains at least 40% by weight of calcium carbonate and 0.1 to 30% by weight of said further filler.

11. An epoxide resin moulding composition according to claim 1, which contains glass fibres in the form of glass rovings.

12. An epoxide resin moulding composition according to claim 9 which contains kaolin as said further filler.

13. An epoxide resin moulding composition according to claim 10 which contains kaolin as said further filler.

14. A commutator or a slipring body wherein the insulating parts thereof consist of the crosslinked epoxy resin molding composition according to claim 1 crosslinked form.

* * * * *